United States Patent [19]
Dietrich, Sr. et al.

[11] 4,117,892
[45] Oct. 3, 1978

[54] AGRICULTURAL FOLDING TOOL BAR WITH RIGID CROSS FRAME

[75] Inventors: William John Dietrich, Sr., Congerville; Cary Leon Sizelove, Eureka, both of Ill.

[73] Assignee: DMI, Inc., Goodfield, Ill.

[21] Appl. No.: 798,632

[22] Filed: May 19, 1977

[51] Int. Cl.² .................................................. A01B 73/00
[52] U.S. Cl. ................................ 172/311; 280/411 A
[58] Field of Search .............................. 172/311, 456; 280/411 R, 411 A, 411 B, 411 C, 412, 413, 639, 656; 56/228, 385

[56] References Cited
U.S. PATENT DOCUMENTS

| | | | |
|---|---|---|---|
| 1,118,901 | 11/1914 | Glenn | 56/385 |
| 3,162,459 | 12/1964 | Marmorine et al. | 280/656 |
| 3,606,848 | 9/1971 | Dobbs et al. | 172/456 X |
| 3,874,459 | 4/1975 | Herberholz | 172/456 X |
| 4,042,044 | 8/1977 | Honnold | 172/456 X |
| 4,042,045 | 8/1977 | Hake | 172/456 X |

FOREIGN PATENT DOCUMENTS

| | | | |
|---|---|---|---|
| 442,761 | 5/1975 | U.S.S.R. | 172/311 |
| 515,481 | 6/1976 | U.S.S.R. | 172/311 |

*Primary Examiner*—Richard T. Stouffer
*Attorney, Agent, or Firm*—Emrich, Root, O'Keeffe & Lee

[57] ABSTRACT

A folding tool bar system for agricultural use includes a cross frame rigidly secured to a main frame at a position forward of the support wheels and rear-folding wings. Ground implements are mounted on the wings and cross frame at equal lateral spacing across the entire system when the wings are extended for use. The innermost sections of the wings are free of implements to facilitate folding the wings rearwardly for road travel without interference between the wheels and the center implements.

6 Claims, 5 Drawing Figures

4,117,892

AGRICULTURAL FOLDING TOOL BAR WITH RIGID CROSS FRAME

BACKGROUND AND SUMMARY

The present invention relates to agricultural tool bars. A tool bar for agricultural use is a device which is adapted to be pulled by a tractor and on which ground-engaging implements are mounted. The tool bar supports the implements, and it also maintains a fixed lateral spacing between the implements.

A wide range of implements may be used on agricultural tool bars such as planters for seeds, chizel plows, coulters, or other tillage tools, applicator knives for anhydrous ammonia, or combinations of these. Hence, the word "implements" is intended to have a broad definition to include all of these various devices, as well as others.

In particular, the present invention is directed to improvements in a rear-folding tool bar of the type being manufactured and sold by Kinze Manufacturing, Inc. of Williamsburg, Iowa. In tool bars of this type, first and second wings are pivotally mounted to a main frame which is provided with support wheels. The wings or "bars" are pivoted between a use position in which the wings extend laterally of the main frame and transverse of the direction of travel of the vehicle, and a road travel position in which the wings extend rearwardly of the main frame and parallel to the direction of the vehicle.

In agricultural tool bars, it is desirable that adjacent units or implements mounted on the wings be spaced at the same distance across the entire extended position of the tool bar. This is normally true whether the implements are planters, tillage tools or fertilizer knives. In some prior tool bars, the width of the tool bar is divided into three section—two wings and a fixed center section, which all align in the extended or use position. The center-folding tool bar of the type described above is, however, preferred because its width in the folded position is more convenient for road travel. There is, however, a problem in a center-folding tool bar of this type in that there is a tendency for the innermost units (that is, those mounted on the central sections of the side wings) to interfere with the ground support wheels on the main frame. Various suggestions have been proposed to overcome this problem, including lifting the implements relative to the wings during folding, and lifting the central portions of the entire wings. These solutions overcome the interference problem, but they require hydraulic control systems or methods of mounting the implements that permit them to be raised. In the case of fertilizer knives and the like, which are normally rigidly secured to the wings, it is not possible to raise the implements relative to the wings. Further, in such instances, there is no need for an expensive hydraulic control system for raising the wings high enough that the implements will clear the wheels.

According to the present invention, a cross frame is rigidly mounted to the main frame independently of the folding wings; and it is located at a forward position. That is, it is located forward of the folding wings and also forward of the wheels. The center implements are mounted on the rigid cross frame so that the innermost sections of the folding wings are free of implements, and there is no interference with the wheels of the frame during folding. At the same time, the rigid cross frame will carry a plurality of implements, and the lateral spacing of all adjacent implements will be the same across the entire extended width of the system. This permits the wings to be folded at central positions, while avoiding the interference problem mentioned above. The improved system may be used with different types of implements, and without the need for special hydraulic control system for units to raise the bars so that the implements clear the support wheels.

Other features and advantages of the present invention will be apparent to persons skilled in the art from the following detailed description of a preferred embodiment accompanied by the attached drawing wherein identical reference numerals refer to like parts in the various views.

THE DRAWING

DETAILED DESCRIPTION

Figure 1:
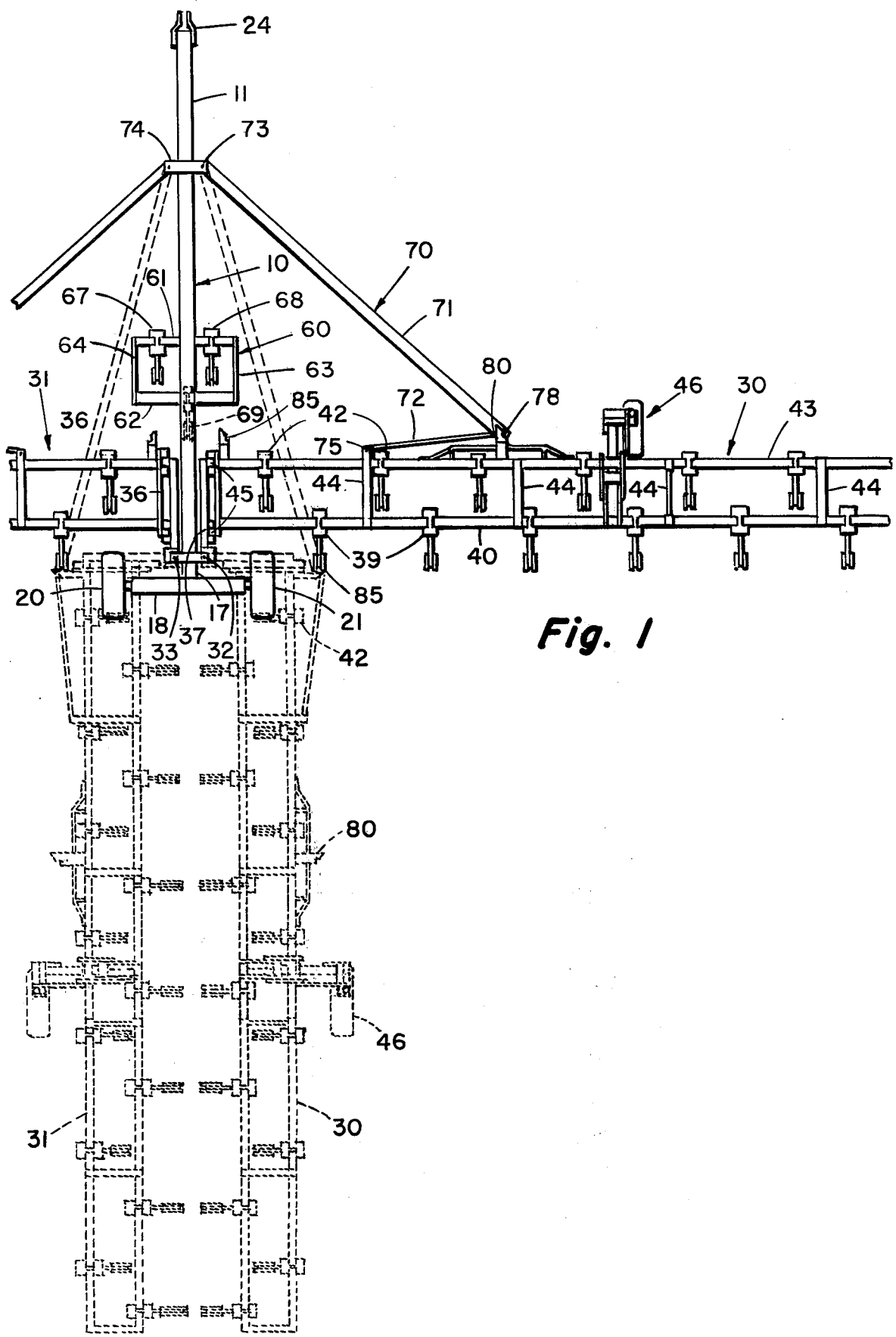
FIG. 1 is a plan view of a center-folding tool bar incorporating the present invention, with one of the wings shown in fragmentary form.
Figure 2:
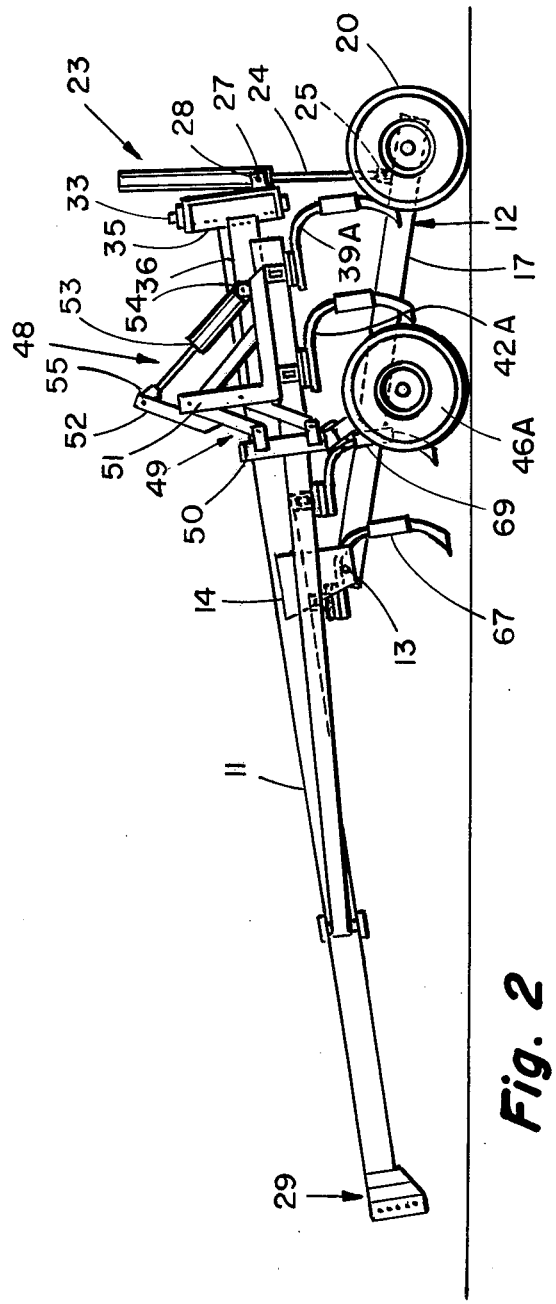
FIGS. 2 and 3 are side views of the system of FIG. 1 with the implements shown respectively lowered for use or raised for folding.
Figure 3:
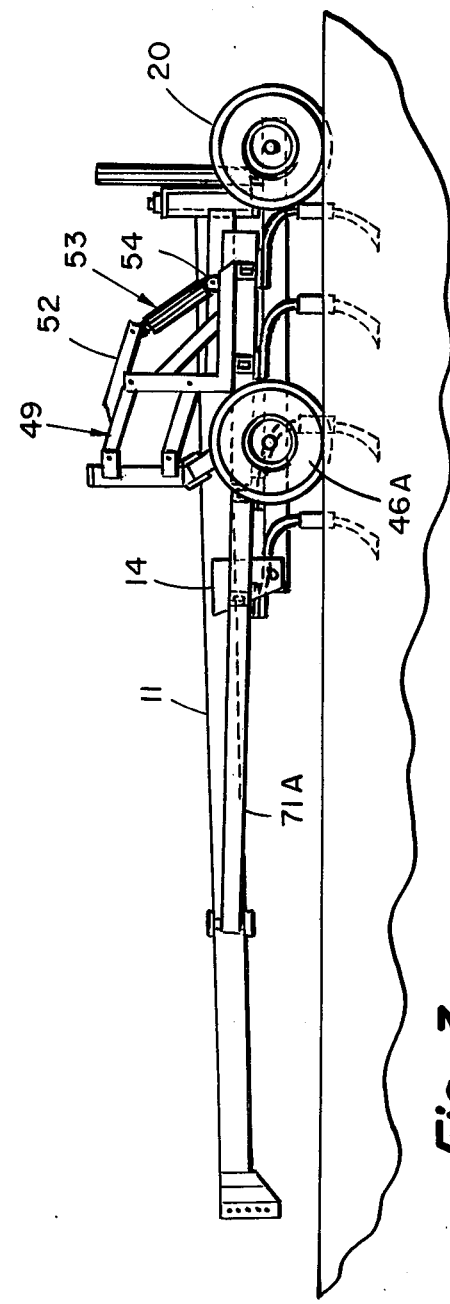

Referring first to FIG. 1, reference numeral 10 generally designates a main frame which includes an elongated tongue or draft member 11 and a sub-carriage generally designated 12 in FIG. 2 which is pivotally connected at 13 to a pair of side plates, one of which is shown at 14 in FIGS. 2 and 3. The plates 14 are welded to the tongue 11. Hence, the sub-carriage 12 is pivotally mounted beneath the draft member 11. The sub-carriage 12 has a general T-shape, including a shorter draft member 17 and a rear cross bar 18 at the sides of which ground support wheels 20, 21 are mounted.

Referring now to FIGS. 2 and 3 in particular, a hydraulic cylinder and piston rod unit generally designated 23 has its rod 24 connected to the sub-carriage 12 at 25. The cylinder of the unit is pivotally connected at 27 to a yoke 28 which is secured to the rear of the principal draft member 11.

The forward end of the draft member 11 is provided with a hitch 29 for connecting it to a traction vehicle.

Still referring to FIG. 1, a pair of wings are generally designated respectively by reference numerals 30 and 31; and they are pivotally mounted by means of pins 32 and 33 respectively to the rear end of the upper draft member 11. In particular, a sleeve 35 is journaled on the pin 33; and a forwardly extending brace 36 is secured to the sleeve 35 and forming a part of the frame of the wing 31. Similarly, referring now to FIG. 1, a brace 37 forms part of the right wing 30. Since the two wings are similar in structure and operation except that they form mirror images of one another, only the wing 30 need be described further for a complete understanding of the invention, it being realized that corresponding elements are provided on the left wing 31.

In the embodiment illustrated in FIG. 1, the wing 30 is designed to hold conventional fertilizer applicators or "knives" with a fixed lateral spacing between adjacent knives. A first set of knives 39 are located on a rear bar 40 of the wing 30. A second set of knives 42 are mounted to a forward bar 43 of the wing 30. The forward and rear bars 43, 40 are formed into a rigid wing or tool bar by means of the number of intermediate braces designated 44 which extend between and are rigidly connected to the forward and rear bars.

The rigid portion of the wing 30 which is comprised of forward and rear lateral frame members 40, 43, as well as the intermediate frame members 44 is secured to the arm 37 by hinges 45 which permit the rigid portion of the frame to rotate about a horizontal axis parallel to the direction of travel of the vehicle when the wing is in the extended use position. This enables the wing to follow the contour of the land while maintaining the depth gauging of the implements during use.

The wing 30 is also provided with a support wheel 46 (see the corresponding wheel 46A shown in FIGS. 2 and 3 for the left wing 31).

Each of the wheels 46, 46A are caster wheels—that is, they are not steered—but they can be raised by means of a mechanism generally designated 48 in FIG. 2. The lifting mechanism includes a parallel linkage generally designated 49 which connects a standard 50 to which the support wheel 46A is mounted to an upright frame member 51 secured to the wing. A lever 52 is rigidly attached to the top member of the parallel linkage; and a cylinder and piston rod unit 53 has its cylinder end pivotally connected at 54 to the rear of the associated wing, and its rod end pivotally connected at 55 to the lever 52.

Comparing FIGS. 2 and 3, when the hydraulic cylinder unit 53 is expanded (FIG. 2), the lever 53 is rotated counterclockwise to crank the parallel linkage 49, thereby raising the wing. Similary, as seen in FIG. 3, when the hydraulic unit 53 is contracted, the lever 52 is rotated clockwise, thereby lowering the wing relative to the support wheel 46A.

Returning now to FIG. 1, a cross frame generally designated 60 is rigidly secured to the main frame at a forward position relative to the wings 30, 31 and the support wheels 20, 21. The cross frame 60 includes a forward frame member 61, a rear frame member 62, and first and second side braces 63, 64 to form a rigid frame. A pair of applicator knives 67, 68 are mounted to the forward frame member 61; and a third applicator knife 69 is mounted to the rear frame member 62.

An articulated link 70 includes a forward link member 71 and a rear link 72. The forward end of the link 71 is connected at 73 to the main frame by means of a bracket 74 secured to the draft member 11. Similarly, the rear end of the link 72 is pivotally connected at 75 to the wing 30. The links 71, 72 are pivotally joined together to provide the articulation; and a pin 78 is provided adjacent this connection for being secured by a latch 80 to hold the wing 30 in its extended use position shown in solid line in FIG. 1. When it is desired to fold the wings for road travel, the pin 78 is disengaged from the latch 80, and as the tractor pulls the tool bar system forward, the wing 30 will "fold" to the position shown in dashed line in FIG. 1 by rotating about the pin 32. When fully folded, the lock pin 78 will engage a second latch 85 adjacent the innermost location of the wing 30 in the extended position (which is a forward location in the folded or road travel position).

It will thus be observed from FIG. 1 that all of the applicator knives are maintained at the same lateral spacing, whether they are the forwardmost knives 67, 68 on the forward bar 61 of the rigid cross frame 60, the rear applicator knife 69 on the rigid cross frame, or the forward or rear knives 42, 39 on the wing 30. At the same time, it will be observed that the innermost ends of the wings (in the extended use position) are free of applicator knives so there is no interference between the knives and the support wheels 20, 21 during folding. Hence, the knives can remain rigidly secured to their associated wings, and there is no need for special mechanism to lift them relative to their wings.

From FIGS. 2 and 3 it can be observed that the various knives are located at four different locations relative to the direction of travel of the vehicle, but the lateral spacing between adjacent knives remains the same.

In use, the hydraulic cylinder unit 23 is used either to raise the main draft member 11 relative to the sub-carriage 12 for road travel, or to lower it to the position of FIG. 3 for use. This hydraulic cylinder unit is used in conjunction with the cylinder units such as the ones shown at 53 in FIG. 3 which are used to raise and lower the outboard ends of the wings.

Figure 4:
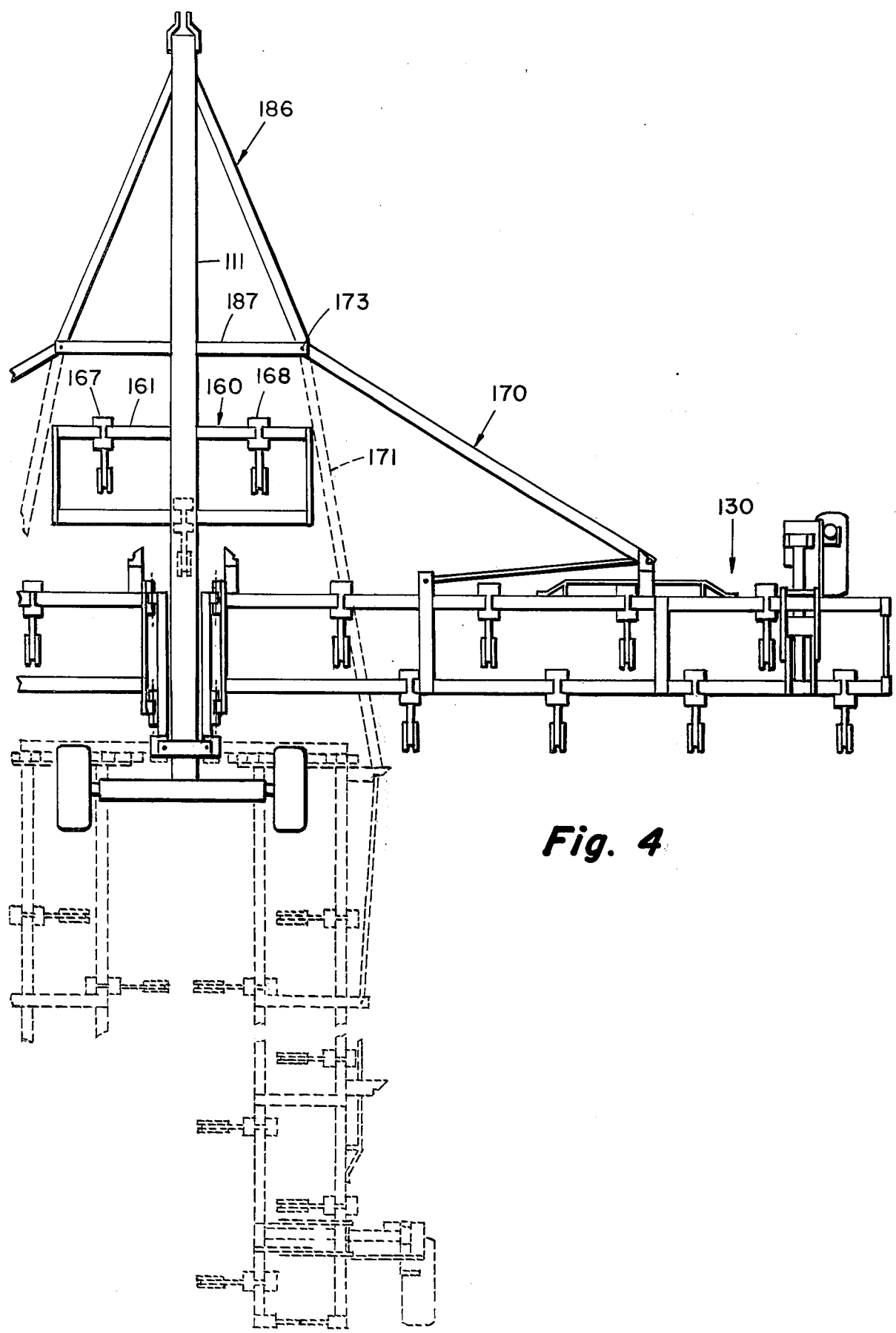
FIGS. 4 and 5 are plan views, also in fragmentary form, of alternative embodiments of tool bars incorporating the present invention.
Figure 5:
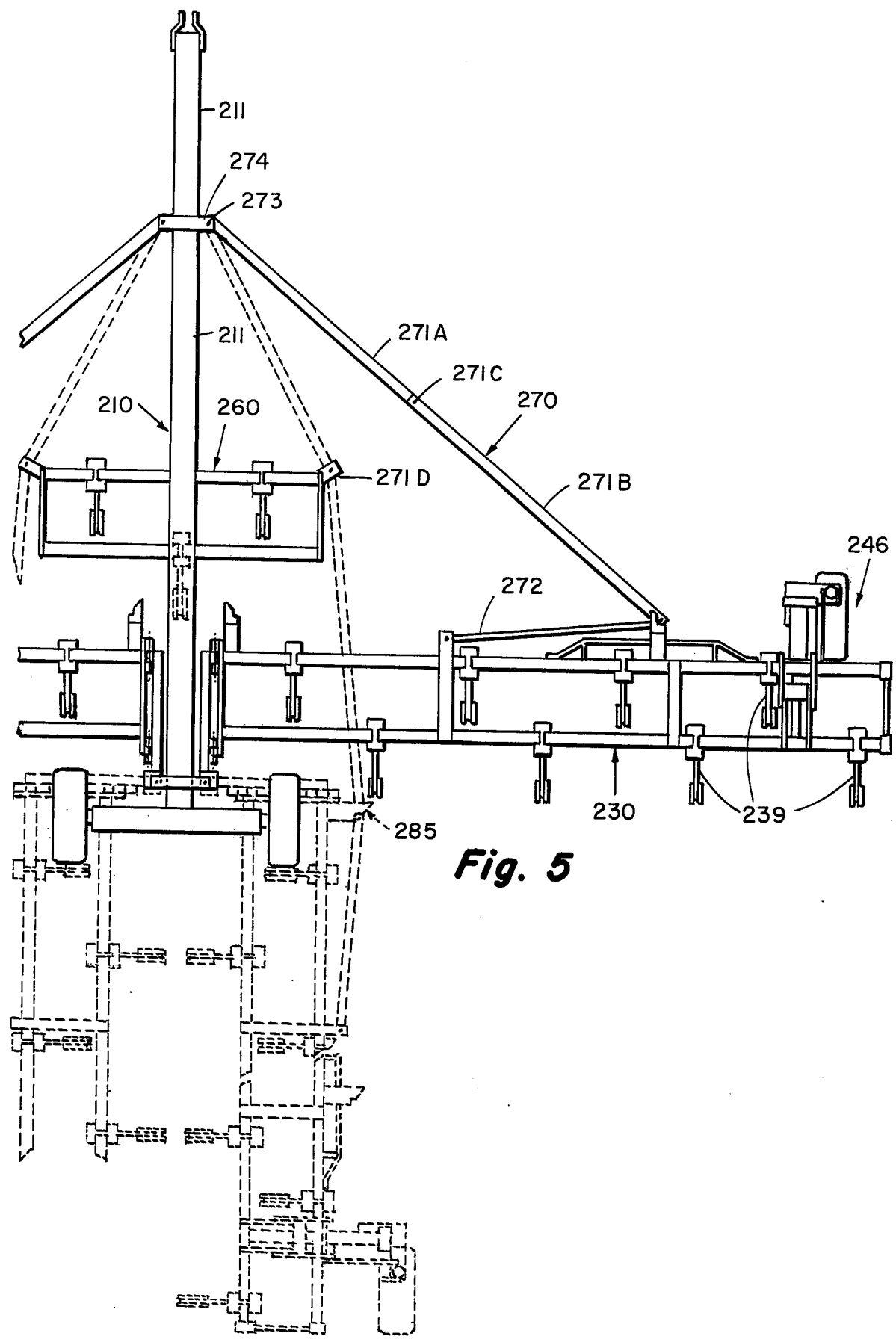

In the embodiment of FIG. 1, each of the wings is adapted for mounting 14 individual applicator knives, but the invention is useful for tool bars of this type which fold at the center (note the close spacing of the pivots 32, 33 relative to the center line of the system), whether provided with more or fewer implements. In the embodiments of FIGS. 4 and 5, the wings are fitted with fewer knives, but the principle is the same. In the embodiments illustrated in these two figures, where elements are shown which have been previously described in connection with the embodiment of FIG. 1, they will be similarly numbered except that for the embodiment of FIG. 4, the reference numerals will be preceded by a "1", and for that of FIG. 5, they will be preceded by a "2".

Turning then to FIG. 4, at the forward end of the principal draft member 111, there is located a rigid triangular frame generally designated 186 which includes a transverse base member 187 which provides the pivot location 173 for the articulated link 170 for the right wing 130. The triangular frame 186 permits the pivot location 173 to be moved laterally outwardly of the principal draft member 111 to provide greater clearance for the forward link 171 of the articulated linkage in the folded position (observe the position of link 171 as shown in dashed line). This may be necessary, for example, in applications where it is desired to have a wider lateral spacing between adjacent units. This requires a wider forward cross bar 161 of the rigid cross frame 160, on which the forwardmost implements 167, 168 are located.

In this embodiment, therefore, the system is adapted for a wider spacing of implements or for a narrower width in the folded position, and interference between the articulated linkage and the forward transverse frame 160 is avoided.

Turning now to FIG. 5, there is shown a further embodiment which is also adapted to a wider extension of the rigid forward cross frame 260. In this embodiment, the forward link of the articulated linkage comprises two individual links 271A and 271B which are pinned together at an intermediate location 271C. The pin 271C is located such that when the wings are folded, this pin engages a latch 271D on the rigid forward cross frame 260. In this manner, the forward portion of the link 271A is pivotally connected at 273 in a manner similar to that shown in the embodiment of FIGS. 1–3. In other respects, the structures are similar in function and operation.

Thus, the present invention provides a folding tool bar system for agricultural use which includes a main frame adapted to be pulled by a traction vehicle with support wheels on the main frame and first and second wings pivotally mounted to the main frame adjacent its center. The wings are adapted for movement between an extended use position in which the wings extend outwardly of the main frame and transverse of the direction of travel of the vehicle, and a road travel position in which the wings extend rearwardly of the main frame and parallel to the direction of travel of the vehicle, and a plurality of ground-engaging implements carried by the wings. In this type of system, the present invention comprises a rigid cross frame (designated 60 in FIG. 1, 160 in FIG. 4 and 260 in FIG. 5) which is secured to the main frame at a position forward of the folding wings and also forward of the support wheels on the main frame. A plurality of the implements are attached to the cross frame such that the lateral spacing of adjacent ones of the implements is uniform across the entire width of the system. The innermost sections of the wings are free of the implements so that the wings may be folded rearwardly without interference between the support wheels and the implements on the wings.

Having thus described in detail alternative embodiments of the present invention, persons skilled in the art will be able to modify certain of the structure which has been illustrated and to substitute equivalent elements for those disclosed while continuing to practice the principle of the invention; and it is therefore, intended that all such modifications and substitutions be covered as they are embraced within the spirit and scope of the appended claims.

We claim:

1. In a folding tool bar system for agricultural use, including a main frame adapted to be pulled by a traction vehicle; support wheels on said main frame; first and second wings pivotally mounted to said main frame adjacent the center thereof for movement between a use position in which the inboard ends of said wings are side by side and said wings extend outwardly of said main frame and transverse of the direction of travel of said vehicle, and a road travel position in which said wings extend rearwardly of said main frame and parallel to the direction of travel of said vehicle; and a plurality of ground engaging implements carried on said wings at equal lateral spacing, the improvement comprising a rigid cross frame rigidly secured to said main frame at a position forward of said folding wings and forward of said support wheels, a plurality of said implements attached to said cross frame such that the lateral spacing of adjacent ones of said implements is uniform across the entire width of said system, the innermost sections of said wings being free of said implements, whereby said wings may be folded rearwardly without interference between said support wheels and implements on said wings; first and second articulated link means for rigidly holding said wings alternatively in an extended use position or a folded road travel position, each of said link means including a first rigid link, a second rigid link pivotally connected to an associated wing, means for interconnecting said first and second links together while permitting articulation between them, and means for pivotally attaching said first link to said main frame at a position forward of said cross frame, and arranged such that said first link and said cross frame do not interfere when said wings are folded rearwardly in said road travel position.

2. The apparatus of claim 1 wherein said main frame includes an elongated draft member, and wherein said rigid cross frame comprises forward and rear cross bars secured to said main draft member; and at least one of said implements spaced on each of said forward and rear cross bars of said rigid cross frame.

3. The apparatus of claim 1 wherein one of said implements is centered on the longitudinal center line of said draft member.

4. The apparatus of claim 1 wherein said main frame includes a longitudinal draft member, said system further comprising brace means mounted to said draft member; and an articulated link between said brace means and an associated wing for holding its associated wing in the extended use position or in their rear folded position, the connection between each wing and said brace being at locations approximately at the outboard extension of said rigid cross frame.

5. The apparatus of claim 1 further comprising means rigidly attached to said main frame forward of said cross frame and extending laterally of said main frame for securing said pivotal attaching means for said first link of each of said articulated link means at respective locations spaced outwardly of said main frame at a location substantially the same as the lateral extension of said rigid cross frame, thereby to further reduce the possibility of interference between said cross frame and said first link in the road travel position.

6. In a folding tool bar system for agricultural use, including a main frame adapted to be pulled by a traction vehicle; support wheels on said main frame; first and second wings pivotally mounted to said main frame adjacent the center thereof for movement between a use position in which said wings extend outwardly of said main frame and transverse of the direction of travel of said vehicle, and a road travel position in which said wings extend rearwardly of said main frame and parallel to the direction of travel of said vehicle; and a plurality of ground engaging implements carried on said wings at equal lateral spacing, the improvement comprising a rigid cross frame rigidly secured to said main frame at a position forward of said folding wings and forward of said support wheels, a plurality of said implements attached to said cross frame such that the lateral spacing of adjacent ones of said implements is uniform across the entire width of said system, the innermost sections of said wings being free of said implements; and articulated link means for each of said wings connected between said main frame and an associated wing for holding said wing alternatively in an extended use position or a folded road travel position, said link means including a first link section pivotally connected to said main frame at a forward location, a second link section pivotally connected to an associated wing, and an intermediate link pivotally connected between said first and second links, the pivotal connection between said first and intermediate links being adapted to engage said rigid cross frame, said rigid cross frame including means for latching said articulated link at said connection; whereby said wings may be folded rearwardly without interference between said support wheels and implements on said wings.

* * * * *